June 26, 1934.  E. KÄGI  1,964,063
STUFFING BOX
Filed Sept. 23, 1930
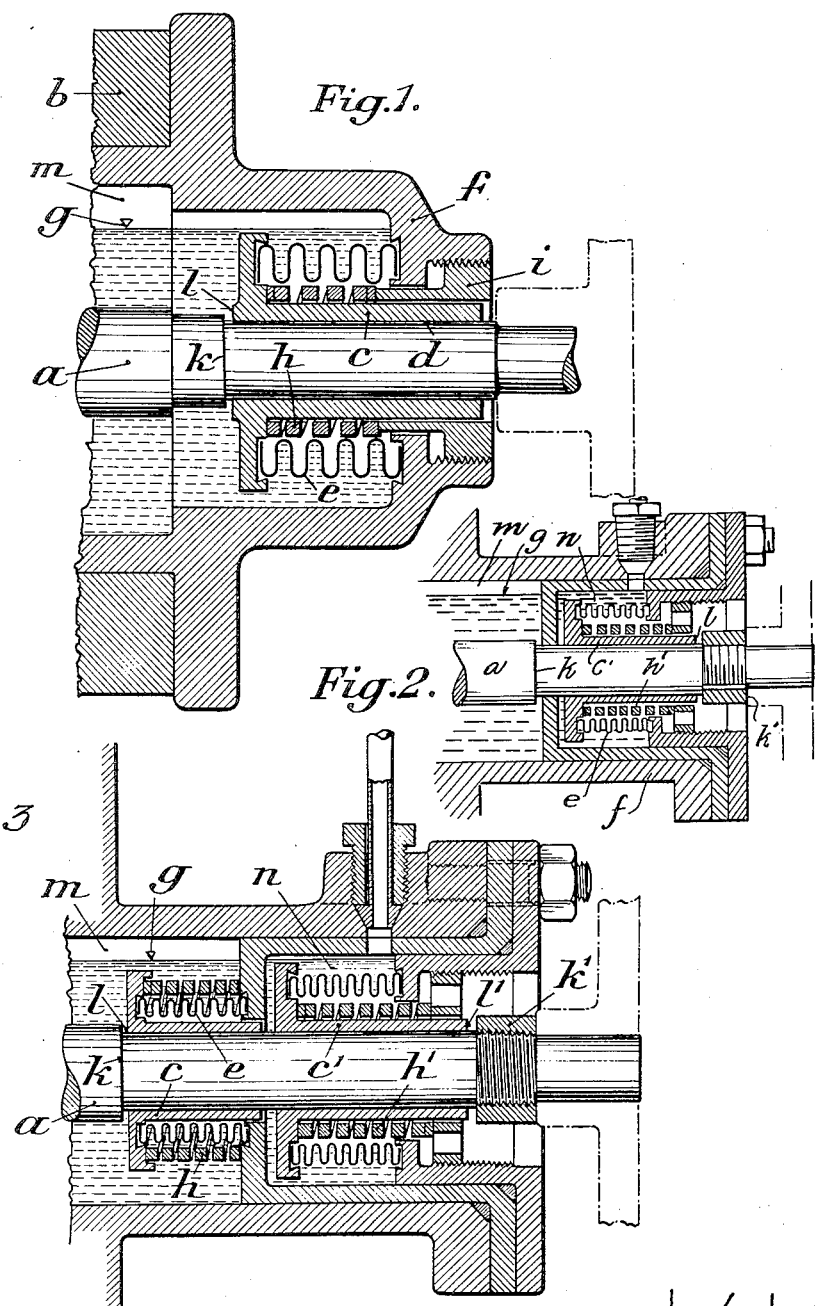
INVENTOR:
Emil Kägi
BY
Pennie, Davis, Marvin & Edmonds
ATTORNEY.

Patented June 26, 1934

1,964,063

UNITED STATES PATENT OFFICE 1,964,063

STUFFING BOX

Emil Kägi, Winterthur, Switzerland, assignor to firm Sulzer Freres Societe Anonyme, Winterthur, Switzerland Application September 23, 1930, Serial No. 483,853
In Switzerland October 7, 1929

6 Claims. (Cl. 286—11)

This invention relates to stuffing boxes and more particularly to stuffing boxes for use with rotating compressor shafts or the like.

In a stuffing box according to this invention a packing member axially slidable upon the shaft is connected to a fixed part of the device by a flexible diaphragm, and a spring is arranged to act on the packing member in opposition to the internal pressure and the end of the member is formed to coact with a shoulder on the shaft to act as a valve, so that when the inner end of the stuffing box is flooded with lubricant to a level above the joint between the packing member and the shaft the lubricant will not leak out. When the compressor is not in operation the packing member is pressed against the seating to form a tight joint with the shaft thereby preventing escape of lubricant, and when the compressor is in operation the packing member is moved away from the seating by the pressure in the compressor, whereupon the lubricant seeps through between the shaft and the packing and serves to prevent the gases reaching the sliding surfaces.

In cases where the internal pressure acting on the packing member in opposition to the spring is less when the machine is stationary than while it is in operation, the arrangement may be such that the valve member is pressed on the seating by the spring which overcomes the internal pressure. Conversely, in those cases where the internal pressure is greater while the machine is idle than when it is in operation, the parts may be so arranged that the packing element is pressed on the seating by the internal pressure overcoming the spring.

If desired two stuffing boxes according to the invention may be arranged in series on the shaft, the inner stuffing box being exposed to the pressure within the delivery chamber of the compressor and the outer stuffing box exposed to the suction pressure. With this arrangement the inner stuffing box is only called upon to deal with the difference between the suction and delivery pressures.

Two constructions of stuffing box according to this invention are illustrated by way of example and as applied to a compressor of a refrigerating machine, in the accompanying drawing, in which Figure 1 is a longitudinal section, Figure 2 is a similar view of an alternative arrangement, and Figure 3 is a similar view of an arrangement combining Figures 1 and 2.

In the construction shown in Figure 1 the rotary shaft $a$ to be packed passes into the delivery chamber $m$ of the compressor, part of the outer casing of which is shown at $b$. A packing member or gland $c$ is arranged on the shaft $a$ so that it is free to slide axially on a cooperating cylindrical surface $d$ on the shaft, the packing member $c$ being connected by a flexible diaphragm $e$ to a supporting frame $f$ by which the stuffing box is secured to the compressor casing $b$. A spring $h$ is arranged between the packing member $c$ and a nut $i$ externally threaded to engage the frame $f$ so that the tension of the spring can be adjusted. The shaft $a$ has an annular flange $k$ adapted to co-operate as a valve with a seating surface $l$ on the packing member $c$. The inner end of the stuffing box is flooded with lubricant, say, up to the level $g$ so that the lubricant prevents access of injurious gaseous working medium to the cooperating cylindrical surfaces of the shaft and packing member $c$.

The spring $h$ is so adjusted that while the compressor is in operation the normal working pressure in the delivery chamber $m$ acts on the packing member $c$ and, overcoming the pressure of the spring $h$, moves the packing member $c$ so that the valve seat $l$ is separated from the valve surface $k$. As soon as the compressor is stopped, however, the spring $h$ overcoming the decreased pressure in the delivery chamber $m$ presses the seat $l$ against the annular valve surface $k$ and thereby provides a tight joint to prevent leakage of lubricant between the sliding surfaces of the shaft and the packing member.

In the modification of Fig. 2 is shown a stuffing box comprising a packing member $c'$, and a spring $h'$ is arranged between a chamber $n$ and the shaft. The chamber $n$ is exposed to the suction of the compressor. A valve surface $l'$ on the member $c'$ is adapted to co-operate with an annular nut $k'$ secured to the shaft $a$ and which serves as an annular seating, etc.

In the alternative arrangement illustrated in Figure 3, in addition to a stuffing box as above described, a second and similar stuffing box comprising a packing member $c^1$ and spring $h^1$ is arranged between a chamber $n$ and the shaft, this chamber being exposed to the suction pressure of the compressor. A valve surface $l^1$ on the packing member $c^1$ cooperates with an annular nut $k^1$ secured to the shaft $a$ and serving as an annular seating. Thus, when the compressor is stopped the pressure in the chamber $n$ increases and moves the packing member $c^1$ against the action of the spring $h^1$ until a tight joint is made between the valve surface $l^1$ and the nut or seating $k^1$.

This construction has the advantage that the inner stuffing box, instead of being called upon to deal with the full pressure from the chamber $m$ above atmospheric pressure, is only exposed to a pressure equal to the difference between the delivery and suction pressures. Leakage of lubricant while the machine is in operation is, with this construction, still further reduced.

I claim:

1. In a stuffing box for a compressor or the like, in which the internal pressure is higher when the machine is at rest than when the machine is in operation, a box, a rotary shaft passing therethrough, a packing member surrounding said shaft and axially slidable thereon, a bellows member sealing said packing member to said box, a shoulder on said shaft cooperating with said packing to form a valve, and a spring tending to hold said packing away from said shoulder to open said valve when the internal pressure sinks to the value it has when the compressor is working, but permitting said packing to move and said valve to close under the influence of the internal pressure, when the internal pressure rises to the value it has when the compressor is at rest.

2. A stuffing box exposed to the delivery pressure of a compressor or the like in which the internal pressure is lower when the machine is at rest than when the machine is in operation, comprising a box, a rotary shaft passing therethrough, a packing member surrounding said shaft and axially slidable thereon, a bellows member sealing said packing member to said box, a shoulder on said shaft cooperating with said packing member to form a valve, a spring tending to hold said packing member against said shoulder to close said valve when the internal pressure falls to the value it has when the compressor is at rest, the tension of said spring being such that said packing member will move and said valve open when the internal pressure rises to the value which it has when the compressor is working, and a second and similar stuffing box exposed to the suction pressure and arranged on the shaft outside the other stuffing box.

3. In a stuffing box for a compressor or the like, in which the internal pressure is different when the machine is at rest than when the machine is in operation, a box, a rotary shaft passing therethrough, a packing member surrounding said shaft and axially slidable thereon, a bellows member sealing said packing member to said box, a shoulder on said shaft cooperating with said packing member to form a valve, and a spring which takes the axial force of the internal pressure on the packing member, the tension of said spring being so correlated to the force exerted on the packing member by the internal pressures that the valve is opened when the machine is in operation and is closed when the machine is at rest.

4. In a stuffing box for a compressor or the like, in which the internal pressure is different when the machine is at rest than when the machine is in operation, a box, a rotary shaft passing therethrough, a packing member surrounding said shaft and axially slidable thereon, a bellows member sealing said packing member to said box, a spring which takes the axial force of the internal pressure on the packing member, said spring having such a tension that the packing member moves outwardly with increasing internal pressure and inwardly with decreasing internal pressure, and a shoulder on said shaft for cooperating with said packing member to form a valve, said shoulder being on that side of the packing member to which the packing member moves when the machine is stopped and from which the packing member moves when the machine is started.

5. In a stuffing box for a compressor or the like, in which the internal pressure is lower when the machine is at rest than when the machine is in operation, a box, a rotary shaft passing therethrough, a packing member surrounding said shaft and axially slidable thereon, a bellows member sealing said packing member to said box, a shoulder on said shaft cooperating with said packing member to form a valve, and a spring which takes the axial force of the internal pressures on the packing member, the tension of said spring being such that it is compressed and the valve is opened by the increasing of internal pressure when the machine is started, and expands and closes the valve when the machine is stopped and the internal pressure decreases.

6. In a stuffing box for a compressor or the like, in which the internal pressure is lower when the machine is at rest than when the machine is in operation, a box, a rotary shaft passing therethrough, a packing member surrounding said shaft and axially slidable thereon, a bellows member sealing said packing member to said box, a shoulder on said shaft cooperating with said packing member to form a valve, and a spring which takes the axial force of the internal pressures on the packing member, the tension of said spring being such that it is compressed and the valve is opened by the increasing of internal pressure when the machine is started, and expands and closes the valve when the machine is stopped and the internal pressure decreases, the tension of said spring also being such that the opening and closing of said valve is effected at a higher pressure than that prevailing in the machine when it is at rest.

EMIL KÄGI.